N. W. STORER.
SYSTEM OF CONTROL.
APPLICATION FILED NOV. 12, 1915.
1,256,842.
Patented Feb. 19, 1918.
4 SHEETS—SHEET 1.
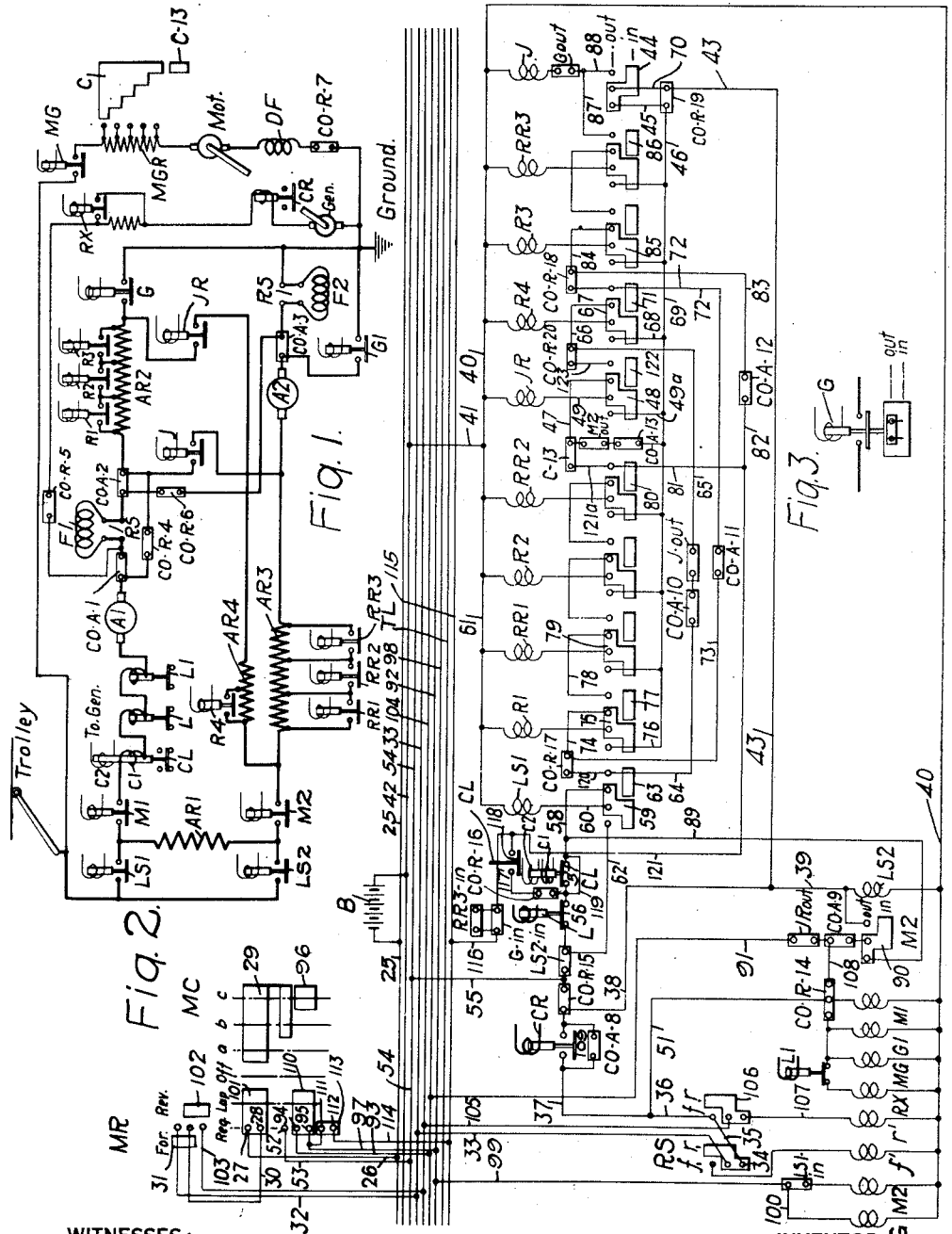
WITNESSES:
INVENTOR
Norman W. Storer.
BY
ATTORNEY N. W. STORER.
SYSTEM OF CONTROL.
APPLICATION FILED NOV. 12, 1915.
1,256,842.
Patented Feb. 19, 1918.
4 SHEETS—SHEET 2.
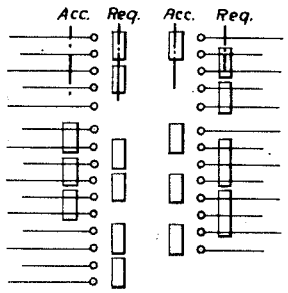
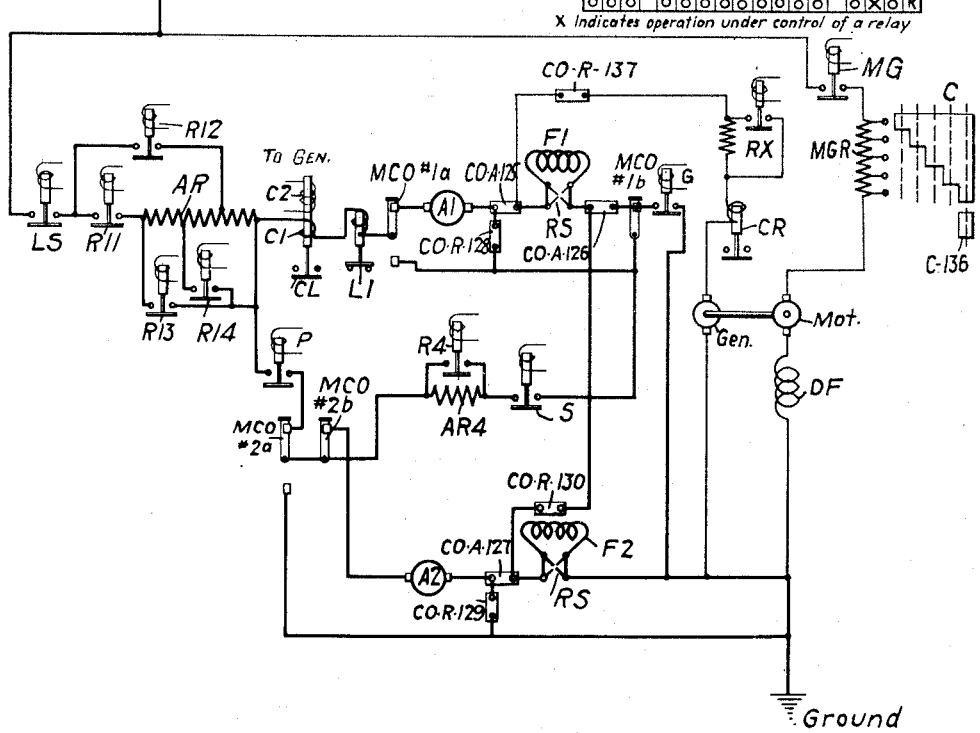
INVENTOR
Norman W. Storer.

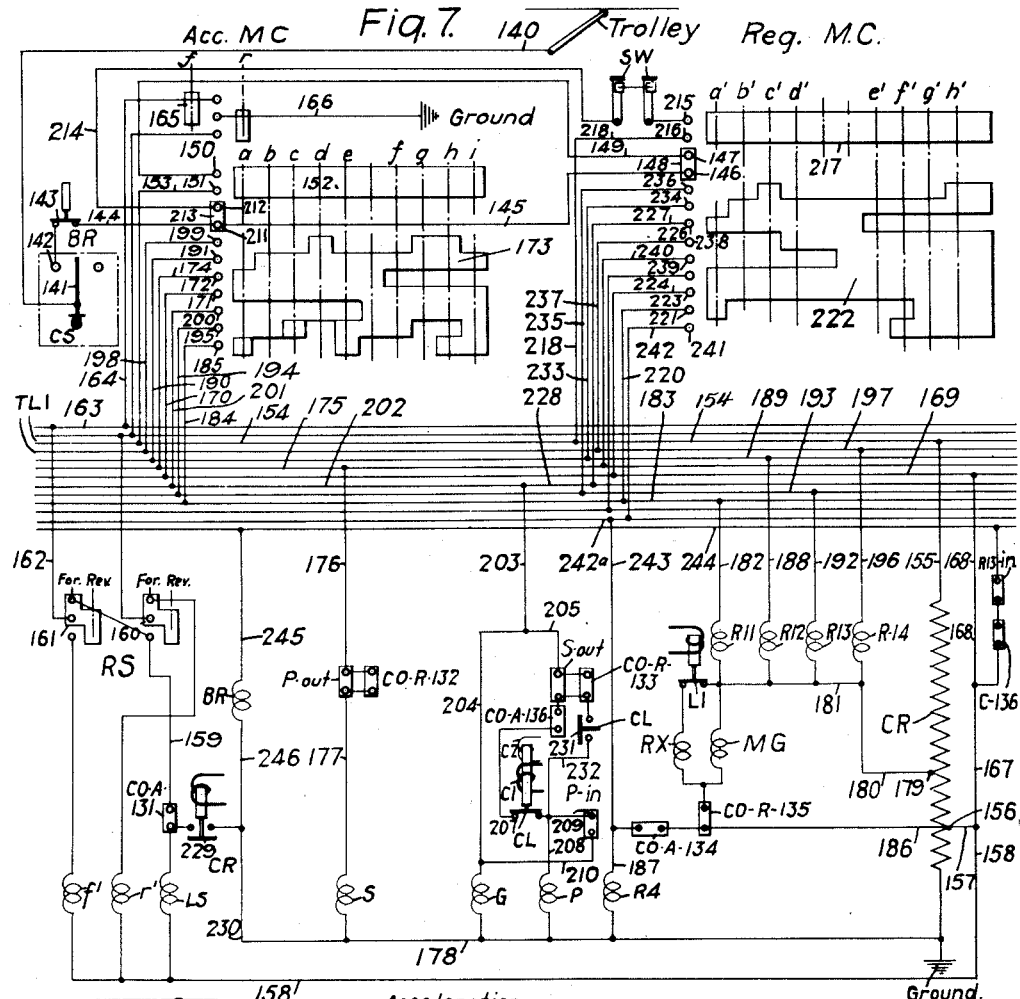

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,256,842.  Specification of Letters Patent.  Patented Feb. 19, 1918.

Application filed November 12, 1915. Serial No. 61,046.

*To all whom it may concern:*

Be it known that I, NORY W. STORER, a citizen of the United States, and a resident of Pittsburgh, in the county of Allegheny and State of Pennsylvania, have invented a new and useful Improvement in Systems of Control, of which the following is a specification.

My invention relates to systems of control for dynamo-electric machines, and it has special reference to the regenerative control of electric railway motors and the like.

One object of my invention is to provide a regenerative system of control of the type employing initial parallel and subsequent series connections of the momentum-driven machines or of their armatures, wherein the transition from parallel to series connection may be effected in a smoother and more effective manner than it has heretofore been accomplished.

Another object of my invention is to provide a regenerative system employing an auxiliary source of energy for exciting the machine field-magnet windings during regeneration, a relay device actuated in accordance with the current traversing said auxiliary source for initially effecting the connection of one machine or armature to the supply circuit, and a second relay device that is actuated in accordance with the current traversing the machine already connected to the supply circuit for connecting the second machine or armature thereto when the current flowing through the first machine or armature reaches a predetermined suitable value.

A further object of my invention is to provide a system embodying the features just recited that shall be effective and reliable in operation and that does not necessitate the use of complicated control apparatus.

Figure 10:
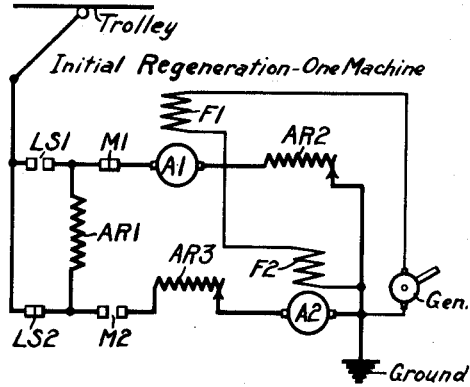
Figure 13:
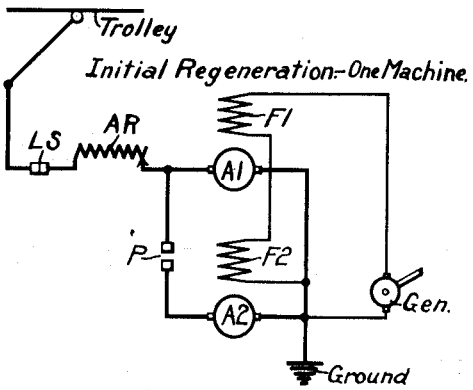
Figure 11:
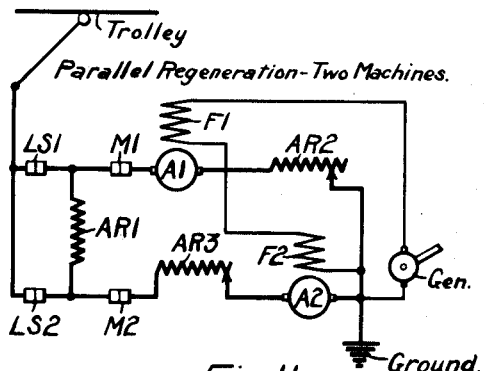
Figure 14:
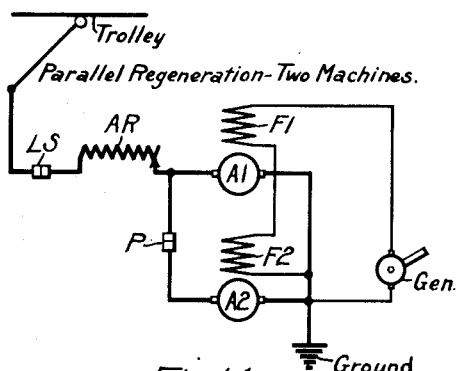
Figure 12:
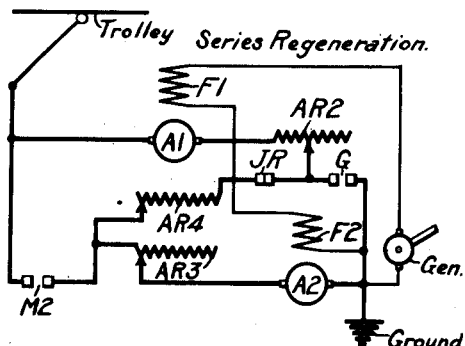
Figure 15:
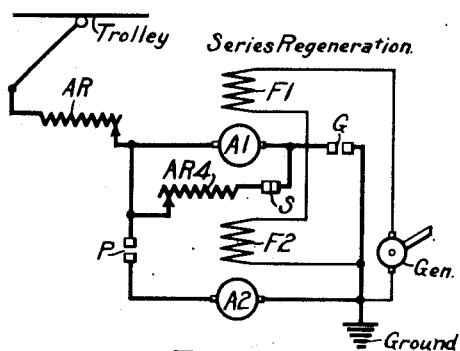

In the accompanying drawing, Figure 1 is a diagrammatic view of the main circuits of a system of control embodying my invention; Fig. 2 is a diagrammatic view of the auxiliary governing system for manipulating the various switches that are shown in Fig. 1 in accordance with the sequence chart of well-known form that is illustrated in Fig. 5; Fig. 3 is a detail diagrammatic view of one of the switches that are shown in Fig. 1; Fig. 4 is a diagrammatic assembly view of one piece of control apparatus, namely, a change-over switch, that is employed in connection with my invention; Figs. 6, 7, 8 and 9 are views corresponding respectively to Figs. 1, 2, 4 and 5, of a modified control system embodying my invention; Figs. 10, 11 and 12 are simplified diagrammatic views, corresponding to Fig. 1 and illustrating the chief circuit connections for initial regeneration with one machine, parallel regeneration with two machines, and series regeneration, respectively, as indicated by the accompanying legends; and Figs. 13, 14 and 15 are similar simplified views corresponding to Fig. 6.

Referring to Fig. 1 of the drawing, the system shown comprises a plurality of suitable supply-circuit conductors respectively marked Trolley and Ground, a plurality of dynamo-electric machines that are adapted to act both as accelerating motors and as momentum-driven generators and respectively having armatures A1 and A2 and field-magnet windings F1 and F2 of the series type; a reversing-switch RS for reversing the electrical relations of the several armatures and field-magnet windings in accordance with customary practice; a plurality of main-circuit switches LS1, LS2, M1, M2, G, and G1; an accelerating resistor AR1 that is adapted to be short-circuited by the concurrent closure of the switches LS1 and LS2; a second accelerating resistor AR2 that is adapted to be short-circuited in sections by switches R1, R2 and R3; a third accelerating resistor AR3 that is adapted to be short-circuited in sections by switches RR1, RR2 and RR3; a fourth accelerating resistor AR4, a predetermined portion of which is adapted to be short-circuited by a switch R4, and which resistor is also adapted to be employed during the transition from regenerative parallel to series relation of the armatures A1 and A2, as hereinafter set forth; an auxiliary source of energy, here shown as a dynamotor of a well-known type, having a motor armature winding Mot., a generator armature winding Gen. mechanically associated therewith, and a common field-magnet winding DF; an auxiliary resistor MGR that is connected in series relation with the armature winding Mot. and which is adapted to be varied in value by means of a suitable controller C; a second auxiliary resistor that is adapted to be short-circuited under predetermined conditions by a switch RX, in a manner to be set forth; a plurality of limit switches or relay devices L, L1 and CL, all of which have an actuating coil connected in series circuit with the machine armature A1; a similar relay device or limit switch CR that has its actuating coil connected in series circuit with the armature winding Gen. of the dynamotor; and a plurality of contact members CO—A—1 to CO—A—3 and CO—R—4 to CO—R—7, that are disposed upon a change-over switch COS—1, as more clearly illustrated in Fig. 4.

The main-circuit reversing-switch RS is preferably of a familiar electrically-controlled type as indicated in Fig. 2, although for the sake of simplicity and clearness the reversing switch is conventionally illustrated in Fig. 1.

The relay device or limit switch CL, in addition to a series-actuating coil C1, is also provided with a second actuating coil C2 that is connected directly across the armature winding Gen. of the dynamotor as indicated in Fig. 1 by the legend "To Gen.". The relay device is designed and adapted to be actuated from the position shown in the drawing to a predetermined upper position when the actuating coil C2 is energized from the armature winding Gen. simultaneously with the traversal through the other actuating coil C1 of a regenerative current from the armature A1; but when the coil C1 is energized by a motoring or accelerating current the relay device CL will not be actuated to its upper position by this means alone, and in case the second actuating coil C2 is simultaneously energized, the actuation of the coils is differential or in opposition and the relay device remains inoperative in its lower position.

The auxiliary governing system of Fig. 2, in addition to the actuating coils of the various switches that are shown in Fig. 1 and the several electrical interlocks that are associated with, and adapted to be actuated by, the respective switches in the familiar manner that is illustrated in Fig. 3, comprises a master controller MC that is adapted to occupy a plurality of operative positions $a$, $b$ and $c$ when actuated in a direction that corresponds to forward or accelerating operation of the dynamo-electric machines, and is adapted to occupy two positions respectively marked "Reg." and "Lap." when the controller is actuated in the reverse or regenerative direction; a suitable source of energy, such as a storage battery B, for the various actuating coils; a plurality of train-line conductors TL; the auxiliary contact members of the various relay devices or limit switches in accordance with familiar practice; a master reverser MR that is adapted to assume a forward and a reverse position as is customary; and a plurality of contact members of the change-over switch COS—1.

The switch COS—1 (Fig. 4) may be of the drum or any other suitable type, and is adapted to assume two positions, marked Acc. and Reg., when the motors are accelerating and regenerating, respectively. The contact members of the switch are designated as CO—A—1, etc., and CO—R—4, etc., corresponding to the accelerating and regenerating switch positions, respectively.

Assuming that the master reverser and the main-circuit reversing-switch occupy their respective forward positions, that the change-over switch is in its accelerating position, and that the master controller is actuated to its initial accelerating position $a$, the operation of the system shown may be described as follows: A circuit is first established from one terminal of the battery B, through train-line conductor 25, conductor 26, control fingers 27 and 28 which are bridged by contact segment 29 of the master controller, conductor 30, contact segment 31 of the master reverser in its forward position, conductors 32 and 33, contact member 34 of the main-circuit reversing-switch RS in its forward position, conductors 35, 36 and 37, contact member CO—A—8 of the change-over switch, conductors 38 and 39, the actuating coil of the switch LS2, conductors 40 and 41 and train-line conductor 42 to the opposite terminal of the battery B.

Another circuit is established from conductor 38, through conductor 43, interlock 44—J—out, conductors 45 and 46, contact member CO—A—13, interlock M2—out, conductor 47, interlock 48—JR—out, conductor 49 and the actuating coil of the switch JR to the negative conductor 40. Upon the closure of the switch JR, a familiar type of holding circuit therefor is formed, comprising interlock 48—JR—in and conductor 49a, which is connected to the energized conductor 46. A further circuit is completed from conductor 37 through conductor 51 and the actuating coil of the switch M1 to conductor 40.

Provided the master controller MC occupies either of its positions $b$ or $c$, a circuit is next established from contact segment 29, through control finger 52, conductor 53, train-line conductor 54, conductor 55, interlock LS2—in, coöperating contact members 56 of the limit switch L, when it has dropped to its lower position, coöperating contact members 57 of the limit switch CL in its lower position, conductor 58, interlock 59—LS1—out, conductor 60, the actuating coil of the switch LS1 and conductor 61 to the negative conductor 41. When the switch LS1 is closed, a holding circuit for its actuating coil is formed, comprising interlock 59—LS1—in and conductor 62 which is connected to conductor 55 through the interlock LS2—in.

Upon the closure of the switch LS1, a further circuit is established from conductor 58, through interlock 63—LS1—in, conductor 64, contact member CO—A—10, interlock J—out, conductors 65 and 66, interlock 67—R4—out and the actuating coil of the switch R4 to the negative conductor 40. In this way a predetermined portion of the resistor AR4 is short-circuited.

The switch R4 is maintained closed by the formation of a holding circuit comprising interlock 67—R4—in, conductor 68 and conductor 69 which is connected to the conductor 46.

Upon the closure of the switch R4 a circuit is completed from conductor 66, through interlock 71—R4—in, conductor 72, contact member CO—A11, conductors 73 and 74, interlock 75—R1—out and the actuating coil of the switch R1 to the negative conductor 61.

The switch R1 is maintained in its closed position by the formation of a holding circuit including interlock 75—R1—in and conductors 76 and 69. When the switch R1 is closed, a further circuit is established from the conductor 74, through interlock 77—R1—in, conductor 78, interlock 79—RR1—out and the actuating coil of the switch RR1 to the negative conductor 61.

The switches R2 and RR2 are successively closed in accordance with the position of the limit switch L, and suitable holding circuits are formed in a manner similar to that already described.

Upon the closure of the switch RR2 a circuit is established from interlock 80—RR2—in, through conductors 81 and 82, contact member CO—A—12, conductors 83 and 84, interlock 85—R3—out and the actuating coil of the switch R3 to the negative conductor 40.

The switch RR3 is subsequently closed in accordance with the position of the limit switch L. At this time, therefore, the motors are disposed in full series relation with all of the main-circuit resistors except a relatively small portion of the resistor AR4, excluded from circuit.

To effect the transition of the motors from series to parallel relation, the familiar bridging type of transition is employed. Upon the closure of the switch RR3, a circuit is completed from interlock 86—RR3—in through conductor 87, interlock G—out and the actuating coil of the switch J to the negative conductor 40.

The switch J is maintained in its closed position by the formation of a holding circuit including conductor 88 which is connected to the interlock G—out, interlock 44—J—in and conductors 70 and 43. Upon the closure of the switch J, the switches R1 to R4, inclusive, and RR1 to RR3, inclusive, are opened by reason of the exclusion from the control circuit of their actuating coils, of the interlock J—out that is connected intermediate the conductors 64 and 65.

The switch JR is also opened by reason of the exclusion from the control circuit of its actuating coil of the interlock 44—J—out.

A circuit is next established from conductor 58, provided the limit switch L occupies its lower position, through conductor 89, interlock 90—M2—out, contact member CO—A—9, interlock JR—out, conductor 91, train-line conductor 92, conductor 93, control fingers 94 and 95 which are bridged by contact segment 96 of the master controller in position c, conductor 97, train-line conductor 98, conductor 99, where the circuit divides, one branch including interlock LS1—in and the actuating coil of the switch M2, and the other branch including conductor 100 and the actuating coil of the switch G, both of the branch circuits being connected to the negative conductor 40.

The closure of the switch G effects the opening of the switch J by reason of the exclusion from the control circuit of the latter switch of the interlock G—out.

At this time the motors are disposed in initial parallel relation, the entire resistors AR2 and AR3 being disposed in circuit with the respective motors.

As soon as the switch J has been opened, the energizing circuit for the switch R4 is completed from the interlock 63—LS1—in in the manner hereinbefore described, and the other resistor short-circuiting switches are subsequently progressively closed in accordance with the position of the limit switch L, as already set forth, whereby the motors are gradually accelerated to full parallel relation.

Assuming that it is desired to effect regenerative operation of the system, the master controller MC may be returned to its off position, the master reverser MR may then be actuated to its reverse position, and the master controller may then be further actuated to its regenerative position "Reg."

A circuit is first established from the positively energized conductor 26, through control fingers 27 and 28 which are bridged by contact segment 101 of the master controller, conductor 30, contact member 102 of the master reverser in its reversed position, conductor 103, train-line conductor 104, conductor 105, contact member 106 of the main reversing-switch RS in its forward position, conductor 107 and the reverse actuating coil $r'$ of the main-circuit reversing-switch, whereby the switch is actuated to its reversed position and the electrical relations of the various main machine field-magnet windings and armatures are reversed for a purpose well-known to those skilled in the art.

A circuit is next established from the contact member 106, in the reversed position of the reversing switch RS, through conductors 36 and 51, contact member CO—R—14, and the parallel-connected actuated coils of the switches MG and G1 to the negative conductor 40. The actuating coil of the switch RX is also energized at this time through the auxiliary contact members of the limit switch L1, which is connected intermediate the contact member CO—R—14 and the actuating coil of the switch. The purpose of the switch RX is to prevent surges of the regenerative current by substantially preventing any relatively sudden and large variations of current in the circuit of the main machine field winding by reason of fluctuations of the supply circuit voltage, for example. The limit switch L1 is adapted to be held in its upper or open position to insert in circuit the resistor that is associated with the switch RX whenever the current traversing the circuit of the armature winding A1 exceeds a predetermined value, and is adapted to drop to its lower or closed position to energize the actuating coil of the switch RX and short-circuit the corresponding resistor whenever the regenerated current decreases below the predetermined value referred to. However, such a regulating system is not a part of my present invention and is fully shown and described in my co-pending application, Serial No. 829,439, filed April 4th, 1914.

The closure of the switch MG connects the armature winding Mot. and the field winding DF of the dynamotor across the supply circuit through the regulating resistor MGR, which may be varied by the controller C, and through a contact member CO—R—7 of the change-over switch.

The armature winding Gen. of the dynamotor is connected from the supply-circuit conductor Ground, through the actuating coil of the relay device or limit switch CR, the resistor that is associated with the switch RX, and the contact member CO—R—5, across a circuit including the reversed field magnet winding F1, contact member CO—R—6, and the reversed field-magnet winding F2 which is connected directly to ground.

A further circuit is established from contact member CO—R—14 (Fig. 2), through conductor 108, interlock JR—out, conductor 91, train-line conductor 92, conductor 93, control fingers 94 and 95 which are bridged by contact segment 110, conductor 97, train-line conductor 98, conductors 99 and 100, and the actuating coil of the switch G to the negative conductor 40.

At this time, although the switches LS1, LS2 and M2 are not closed, the armature circuits of the momentum driven dynamo-electric machines may be traced as follows: from one terminal of the switch LS1, through the switch M1, the series actuating coils of the relay devices or limit switches CL, L, and L1, the armature A1, contact member CO—R—4, accelerating resistor AR2, the switch G, and thence directly to the negative conductor Ground, while the circuit of the other machine armature includes one terminal of the switch M2, the accelerating resistor AR3, the armature A2 and the switch G1 which is connected to Ground. In this way, the machine armatures are connected in parallel relation with the resistors AR2 and AR3 in circuit with the respective armatures, while the field-magnet windings are connected in a local circuit with the armature winding Gen. of the dynamotor and are entirely electrically independent of the armature circuits.

The controller C may be manipulated in any suitable manner to vary the resistor MGR and thereby vary the speed of the dynamotor and the voltage delivered to the field-winding circuit of the momentum-driven machines, thus gradually increasing the field excitation of the regenerating machines as the braking speed gradually decreases.

When the voltage of the armature winding Gen. is of a value sufficient to send a current through the field winding circuit to effect the actuation of the relay device or limit switch CR, the switch lifts to its upper or closed position, whereby an auxiliary governing circuit is completed from conductor 37, through the coöperating contact members 109 of the limit switch CR in its closed position, conductors 38 and 39 and the actuating coil of the switch LS2, to the negative conductor 40.

The armature A1 is thus connected to the supply-circuit conductors through the accelerating resistor AR1, the switch LS2 and the circuit hereinbefore traced (see Fig. 10).

As soon as a predetermined current, say 10 per cent. of full load value, traverses the armature in question and the series actuating coil of the relay devices, the device CL is raised to its upper position, inasmuch as the series coil C1 and the other coil C2, which is connected across the armature winding Gen., are adapted to assist each other in the manner hereinbefore pointed out, whereby an auxiliary governing circuit is completed from conductor 97, through control fingers 111 and 112 which are bridged by contact segment 113 of the master controller, conductor 114, train-line conductor 115, conductor 116, interlock G—in, conductor 117, coöperating contact members 118 of the relay device CL in its closed position, contact member CO—R—16, and conductors 119 and 58 to the actuating coil of the switch LS1 in a manner similar to that already described in connection with the acceleration of the motors. The switch M2 is closed as soon as the switch LS1 has been actuated to its closed position by reason of the completion of a control circuit from the conductor 99, through interlock LS1—in and the actuating coil of the switch M2 to the negative conductor 40.

The other machine armature A2 is thus connected to the supply circuit through the switches M2 and LS2 and the circuit hereinbefore traced (see Fig. 11).

It will be seen that the connection of one of the momentum-driven armatures to the supply-circuit is dependent upon the value of current traversing the armature winding Gen. of the dynamotor, while the other machine armature is dependent upon the traversal of a predetermined current through the first main armature for subsequent connection to the supply circuit. In this way, a relatively smooth and reliable connection of the momentum-driven machines to the supply circuit is effected, and severe voltage and current fluctuations with their accompanying disadvantages are substantially prevented. Upon the closure of the switch LS1, a circuit is completed from the interlock 63—LS1—in, through conductor 120, contact segment CO—R—17, conductor 74, interlock 75—R1—out and the actuating coil of the switch R1. The switches RR1, R2 and RR2 are then progressively closed, dependent upon the position of the limit switch L, in the manner hereinbefore described.

The closure of the switches R3 and RR3 at this time is prevented by the exclusion from the control circuits of these switches of the contact member CO—A—12 that serves to connect the conductors 82 and 83, when the change-over switch occupies its accelerating position.

Consequently, predetermined portions of the resistors AR2 and AR3 remain in circuit with the respective main armatures, thereby exerting a balancing effect to maintain a substantially equal distribution of current between the regenerating armatures.

To effect transition of the regenerating machine armatures from parallel to series relation, a circuit is initially established from conductor 117, through conductors 121, 81 and 121a, contact member C—13 of the auxiliary controller C in its final operative position, conductor 47, interlock 48—JR—out, conductor 49 and the actuating coil of the switch JR to the negative conductor 40.

In this way, the resistor AR4 and those portions of the resistors AR2 and AR3 that are respectively adapted to be short-circuited by the switches R3 and RR3, are disposed in circuit intermediate the machine armatures A1 and A2, as soon as the switches M2 and G are opened which occurs by reason of the exclusion from circuit at this time of the interlock JR—out that is connected to the conductor 91. Upon the closure of the switch JR, a circuit is completed from interlock 122—JR—in, through conductor 123, contact member CO—R—20, conductor 66, interlock 67—R4—out and the actuating coil of the switch R4, which closes to short-circuit a predetermined portion of the resistor AR4.

The closure of the switch R4 effects the establishment of a circuit from interlock 71—R4—in, through contact member CO—R—18, conductor 84, interlock 85—R3—out and the actuating coil of the switch R3 to the negative conductor 40. The switch RR3 is subsequently closed, dependent upon the actuation of the limit switch L, in the manner hereinbefore set forth.

It will thus be seen that the transition of the regenerating machines from parallel to series relation is effected in a relatively smooth and reliable manner by initially inserting in circuit intermediate the two regenerating armatures the entire resistor AR4 and predetermined portions of the resistors AR2 and AR3, which resistors are then gradually short-circuited to maintain substantially constant regenerated current as the motor armatures change from parallel to series relation (see Fig. 12).

Upon the closure of the switch R3, a circuit is established from interlock 86—RR3—in, through conductor 87, interlock G—out and the actuating coil of the switch J to the negative conductor 40. In this way, the remaining portion of the resistor AR4 is short-circuited by the direct connection of the armatures A1 and A2, and the motor armatures are disposed in full series relation and may return energy to the supply circuit until a relatively low speed is reached, when, if desired, the air brakes or other mechanical brakes of the system may be automatically brought into operation in the manner shown and described in my co-pending application, Serial No. 860,608, filed September 8, 1914.

In case the locomotive is traveling down a grade and it is desired to maintain a substantially constant speed upon the grade, the operation of the regenerative system may be arrested at any suitable point to provide the desired rate of speed by manipulating the master controller to the position marked "Lap." In this position, the contact segment 113 disengages the control finger 111 and 112, whereby the circuits that are associated with the conductor 116 may be interrupted. Consequently, the automatic operation of the system may be halted whenever a sufficient number of resistor short-circuiting switches has been closed and the locomotive or car will travel down the above-mentioned grade at a corresponding and substantially constant speed. To effect the remaining automatic operation of the system when the locomotive or car reaches a level stretch of track or, if it is desired to still further decrease the rate of speed down the grade, then the master controller may be again moved to its position marked "Reg." whereby the remainder of the system operation will be effected in the manner already described.

Reference may now be had to Fig. 6, wherein the main circuits shown comprise a plurality of suitable supply-circuit conductors respectively marked Trolley and Ground; a plurality of dynamo-electric machines having armatures A1 and A2 and field-magnet windings F1 and F2, respectively; a reversing switch preferably of the type mentioned in connection with Fig. 1; an accelerating resistor AR; a plurality of main-circuit switches LS, S, P, and G; a plurality of switches R11, R12, R13 and R14 that are associated with the accelerating resistor AR in a manner to be described; a resistor AR4 that is employed for transition purposes during the transition of the regenerating machines from parallel to series relation, and which resistor is adapted to be short-circuited under predetermined conditions by a switch R4; the dynamotor, the controller C, the switches MG and RX, as already described in connection with Fig. 1; a plurality of suitable motor-cutout switches MCO#1a and MCO#1b for excluding the motor having the armature A1 from circuit under conditions of damage to the motor, in accordance with a familiar practice; a plurality of similar switches MCO#2a and MCO#2b for similarly manipulating the other motor having the armature A2; the relay devices or limit switches CL, L1 and CR, as previously described, and a plurality of contact members that are associated with the change-over switch COS—2 that is illustrated in Fig. 8 and which is adapted to occupy one position, marked "Acc." when the motors are to be accelerated and a second position marked "Reg." when the machines are to be employed as generators to return energy to the line.

Reference may now be had to Fig. 7 which shows, in addition to the actuating coils for the various switches that are illustrated in Fig. 6 and a plurality of interlock members that are associated with various switches in the familiar manner illustrated in Fig. 3, a master controller marked "Acc. MC" that is adapted to be employed for effecting acceleration of the motors and that is arranged to occupy a plurality of operative positions $a$ to $i$, inclusive; a second master controller marked "Reg. MC" that is adapted to govern the various main-circuit switches during the regenerative operation of the system and that is arranged to occupy a plurality of operative positions $a'$ to $h'$, inclusive; a control resistor CR that is adapted to deliver energy of a suitable voltage to the actuating coils of the various switches through the agency of the master controllers; a plurality of suitable train-line conductors TL1; a brake relay device BR that is employed at the end of the regenerative period in a manner to be described; and the various auxiliary contact members of the several limit switches in accordance with customary practice.

Assuming that it is desired to effect acceleration of the motors, that the change-over switch is in its accelerating position, and that the master reverser MR and the main-circuit reversing-switch RS occupy their respective forward positions, the master controller Acc. MC may be actuated to its initial position $a$, and the subsequent operation of the system may be described as follows: a circuit is first established from the trolley, through conductor 140, coöperating movable and stationary contact members 141 and 142 of a suitable control switch CS, the coöperating auxiliary contact members 143 of the brake relay device BR in its lower position, conductors 144 and 145, control fingers 146 and 147 which are bridged by contact segment 148 of the other master controller Reg. MC, whereby operation of the accelerating master controller is positively prevented unless the regenerating master controller occupies its off position, conductor 149, control fingers 150 and 151 which are bridged by contact segment 152 of the master controller Acc. MC, conductor 153, train-line conductor 154, conductor 155 and the control resistor CR to the negative conductor Ground.

As soon as the control resistor CR is energized, a circuit is established from an intermediate point 156 thereof, through conductors 157 and 158, the actuating coil of the switch LS, contact member CO—A—131, conductors 159 and 160, contact member 161 of the main reversing-switch RS, conductor 162, train-line conductor 163, conductor 164, contact member 165 of the master reversing-switch MR in its forward position, and conductor 166 to the negative conductor Ground, whereby the circuit of the actuating coil of the switch LS from the control resistor CR is completed.

Another circuit is simultaneously established from conductor 157, through conductors 167 and 168, train-line conductor 169, conductor 170 and control fingers 171 and 172 which are bridged by contact segment 173 of the master controller, conductor 174, train-line conductor 175, conductor 176, interlock P—out, conductor 177, the actuating coil of the switch S and conductor 178 to the negative conductor Ground.

Another circuit is established at this time from a second intermediate point 179 of the control resistor CR, through conductors 180 and 181, the actuating coil of the switch R—11, conductor 182, train-line conductor 183, conductor 184 and control finger 185 that engages the contact segment 173 of the master controller which, as already mentioned, is associated with the other intermediate point 156 of the control resistor.

A still further circuit is established at this time from the intermediate point 156 of the control resistor, through conductor 186, contact segment CO—A—134 and conductor 187 to the actuating coil of the switch R4.

The motors are thus started into operation with the entire resistor AR in series circuit relation therewith.

When the master controller is actuated to its second position $b$, a circuit is established from conductor 181, through the actuating control of the switch R12, conductor 188, train-line conductor 189, conductor 190, and control finger 191 which engages the contact segment 173 of the master controller. The switch R11 opens at this time by reason of the disengagement of contact segment 173 and controller 185.

Upon actuation of the master controller to its third operative position $c$, a circuit is completed from the conductor 181 through the actuating coil of the switch R13, conductor 192, train-line conductor 193, conductor 194, and control finger 195 which engages the contact segment 173.

In position $d$ of the master controller, a circuit is completed from conductor 181, through the actuating coil of the switch R14, conductor 196, train-line conductor 197, conductor 198, and control finger 199 which engages the contact segment 173. The switch R13 is opened in this position of the master controller.

In position $e$ of the master controller, the contact segment 173 thereof again engages the control finger 185, whereby the switch R11 is again closed. The switch R14 is simultaneously opened, and the switch R13 again closes.

The motors are at this time disposed in full series relation with all of the accelerating resistor AR, thus gradually excluded from circuit.

To effect the familiar "shunting" transition of the motors from series to parallel relation, the switch G is first closed by reason of the engagement of the contact segment 173 in the transition position of the master controller with control finger 200, whence circuit is completed through conductor 201, train-line conductor 202, conductors 203 and 204, and the actuating coil of the switch G to the negative conductor 178.

Just prior to the closure of the switch G, the switch R11 opens, by reason of the disengagement of the contact segment 173 from the control finger 185.

When the master controller occupies its position $f$, the actuating coil of the switch S is deënergized, and a circuit is then established from conductor 203, through conductor 205, interlock S—out, contact member CO—A—136, coöperating stationary and movable contact members 207 of the relay device or current limit CL in its lower position, conductor 208, and the actuating coil of the switch P to the negative conductor 178.

Upon the closure of switch P, a holding circuit therefor is formed, comprising conductors 208 and 209, interlock P—in, and conductor 210, which is connected to conductor 204.

The motors are thus disposed in initial parallel relation with a predetermined portion of the acelerating resistor AR in circuit.

In position $g$ of the master controller, the switch R14 is again closed by reason of the engagement of the contact segment 173 with the control finger 199 and the switch R13 is opened at this time by reason of the disengagement of the contact segment 173 and the control finger 195.

In position $h$ of the master controller, the switch R11 is closed in a manner similar to that hereinbefore described, and in the final position $i$, the switch R13 is closed while the switch R14 is opened. The motors are thus disposed in full parallel relation with all of the accelerating resistor AR excluded from circuit.

Assuming that it is desired to effect regenerative operation of the system, the master controller Acc. MC may be returned to its off position, and the master reverser may be moved to its reverse position, for a familiar purpose, whereupon the other master controller Reg. MC may be actuated to its initial operative position $a'$. Under these conditions, a circuit is first established from the trolley, through conductor 140, the control switch CS, conductor 144, control finger 211 and 212 which are bridged by contact segment 213 of the master controller Acc. MC in its off position, whereby operation by the other master controller Reg. MC is positively prevented unless the controller Acc. MC does occupy its off position, conductor 214, the blades of a switch SW, control fingers 215 and 216 which are bridged by contact segment 217 of the master controller Reg. MC, conductor 218, train-line conductor 154, and the conductor 155 which is directly connected to the control resistor CR.

A circuit is then completed from the intermediate point 179 of the control resistor, through the conductors 180 and 181, the actuating coil of the switch MG, contact member CO—R—135, and conductor 186 to the second intermediate point 156 of the control resistor.

Another circuit is simultaneously established from the conductor 181, through the actuating coil of the switch R11, conductor 182, train-line conductor 183, conductor 220, control finger 221, contact segment 222 of the controller Reg. MC, control finger 223, conductor 224, train-line conductor 169 and conductors 168, 167 and 157 to the intermediate point 156 of the control resistor CR.

A further circuit is established at this time from the contact segment 222, through control finger 226, conductor 227, train-line conductor 228, conductors 203 and 204 and the actuating coil of the switch G to the negative conductor 178.

As soon as the switch MG is closed, a circuit is completed from the trolley, through the switch MG, the resistor MGR (see Fig. 6) the armature winding Mot. and the field winding DF of the dynamotor to the negative conductor ground. The armature winding Gen. of the dynamotor is connected from one terminal of the field-magnet winding F2, through the actuating coil of the relay device or limit switch CR, the resistor that is associated with the switch RX or the switch itself in accordance with the position thereof, as hereinbefore set forth, contact member CO—R—137, the reversed field-magnet winding F1, contact member CO—R—130 and the reversed field-magnet winding F2.

The armature circuits at this time, although the switches LS and P are not closed as yet, comprise the switch R11, the common resistor AR, the series actuating coils of the relay devices CL and L1, the switch MCO#1a, the armature A1, contact member CO—R—128, the switch MCO#1b and the switch G which is directly connected to ground; whereas the circuit of the other motor armature includes one contact member of the open switch P, the switches MCO#2a and MCO#2b, the armature A2 and the contact member CO—R—129 which is directly connected to ground. Thus, the reversed field-magnet windings are included in a local circuit with the armature winding Gen. that is entirely independent of the circuits of the motor armatures, similarly to the regenerative connections of the system that is shown in Fig. 1. The momentum-driven armature A1 is adapted for connection to the supply circuit by the closure of the switch LS, whereas the other motor armature A2 is adapted for connection to the supply circuit by the closure of the switch P, in a manner about to be described.

Upon the traversal of a current of predetermined value through the armature winding Gen. of the dynamotor and the actuating coil of the relay device CR, the device is lifted to its upper or closed position, whereby a circuit is completed from the intermediate point 156 of the control resistor through conductors 157 and 158, the actuating coil of the switch LS, the coöperating contact members 229 of the relay device CR in its closed position, and conductors 230 and 178 to the negative conductor ground.

The momentum-driven armature A1 is thus connected to the supply circuit (see Fig. 13), and upon the traversal of a predetermined current through the circuit of that armature, the relay device or limit switch CL is actuated to its upper or closed position, inasmuch as the second actuating coil C2 thereof is energized in a direction to assist the action of the series coil C1, as hereinbefore described, and a circuit is thereupon completed from the conductor 205, through contact member CO—R—133, coöperating contact members 231 of the relay device CL in its closed position, conductors 232 and 208 and the actuating coil of the switch B to the negative conductor ground (see Fig. 14).

In this way, the momentum-driven armature A1 is connected to the supply circuit to return energy thereto when the current traversing the field-winding circuit reaches a predetermined value, and the other armature A2 is subsequently connected to the supply circuit when the current traversing the first-connected armature attains a predetermined value, as more fully set forth hereinbefore in connection with the system that is shown in Fig. 1.

Upon actuation of the master controller to its second operative position $b'$, a circuit is established from the conductor 181, through the actuating coil of the switch R12, conductor 188, train-line conductor 189, conductor 233, and control finger 234 which engages the contact segment 222, thereby closing the switch R12. The switch R11 is opened at this time.

In position $c'$ of the master controller, a circuit is completed from the conductor 181, through the actuating coil of the switch R13, conductor 192, train-line conductor 193, conductor 235 and control finger 236 which engages the contact segment 222.

In position $d'$, a circuit is established from the conductor 181, through the actuating coil of the switch R14, conductor 196, train-line conductor 197, conductor 237 and control finger 238 which engages the contact segment 222. The switch R13 is simultaneously opened.

The motor armatures are thus connected in full parallel relation, with the accelerating resistor AR short-circuited.

To effect the transition of the motor armatures from parallel to series relation, the switch S is first closed by reason of the energization of a circuit including control finger 239 which engages the contact segment 222, conductor 240, train-line conductor 175, conductor 176, contact member CO—R—132, conductor 177, the actuating coil of the switch S, and the negative conductor 178.

As the master controller reaches its position $e'$, the switches G and P are opened by reason of the disengagement of the contact segment 222 and the control finger 226.

The transition of the regenerating machine armatures from parallel to series relation is thus effected in a relatively smooth and reliable manner that is similar to the method employed in the system that is shown in Fig. 1: namely, the resistor AR4 is initially connected intermediate the armatures A1 and A2 to prevent an undue rush of current, and the resistor AR4 is subsequently short-circuited by the switch R4 in the following manner: When the controller is moved to its position $f'$, the switch R4 is closed by reason of the energization of a circuit including control finger 241 which engages contact finger 222, conductor 242, train-line conductor 242a, conductors 243 and 187 and the actuating coil of the switch R4, whereby the transition resistor AR4 is short-circuited (see Fig. 15).

In positions $g'$ and $h'$, the switches R11 and R13 are successively closed by reason of the engagement of the contact segment 222 with the control fingers 221 and 236, respectively, and the regenerating armatures are disposed in full series relation across the supply circuit.

When the switch R13 is closed and the controller C has been manipulated to its final position in the manner hereinbefore described in connection with Fig. 1, a circuit is completed from the conductor 167, through contact member C—136 of the controller C, interlock R13—in, train-line conductor 244, conductor 245, the actuating coil of the brake relay device BR and conductors 246 and 230 to the negative conductor 178. The brake relay device BR is thus actuated to its upper or open position whereby the energization of the various switch actuating coils is interrupted and the regenerative circuits are opened. If desired, the mechanical or air brake of the vehicle may then be put into operation in the manner outlined in connection with the system that is shown in Fig. 1.

I do not wish to be restricted to the specific circuit connections and arrangement of parts herein set forth, as various modifications thereof may be effected without departing from the spirit and scope of my invention. For example, instead of a dynamotor, a motor-generator set or a storage battery may be utilized. I desire, therefore, that only such limitations shall be imposed as are indicated in the appended claims.

I claim as my invention:

1. In a system of control, the combination with a supply circuit, and a plurality of dynamo-electric machines, of means for initially connecting the machines in parallel relation, a plurality of resistors connected in circuit with the respective machines during parallel operation thereof, a third resistor connected intermediate said machine circuits to inaugurate parallel-series transition, means for disconnecting one of said machines from one supply-circuit conductor and means for disconnecting the other machine from the other supply-circuit conductor to dispose said machines, said third resistor, and predetermined portions of the other resistors in series relation, and means for subsequently short-circuiting predetermined active portions of said resistors.

2. In a system of control, the combination with a supply-circuit, a plurality of momentum-driven dynamo-electric machines, and an auxiliary source of energy for exciting the field-magnet windings thereof, of means dependent upon the value of current traversing said auxiliary source for regeneratively connecting one of said machines to the supply circuit, and means dependent upon the value of current traversing one of the machine circuits for subsequently connecting the other machine to the supply circuit.

3. In a system of control, the combination with a supply-circuit, a plurality of momentum-driven dynamo-electric machines, and an auxiliary source of energy for exciting the field-magnet windings thereof, of a plurality of relay devices respectively actuated in accordance with the current traversing said auxiliary source and one of said machines, means dependent upon one of said relay devices for regeneratively connecting one of said machines to the supply circuit, and means dependent upon the other relay device for subsequently connecting the other machine to the supply circuit.

4. In a system of control, the combination with a supply circuit, a plurality of momentum-driven dynamo-electric machines, and an auxiliary source of energy for exciting the field-magnet windings thereof, of a plurality of relay devices respectively having actuating coils adapted to be energized by the currents traversing said auxiliary source and the first of said machines, switching means dependent upon the first of said relay devices for regeneratively connecting said first machine to the supply circuit, and switching means dependent upon predetermined energization of the second relay device for subsequently connecting the other machine to the supply-circuit.

5. In a system of control, the combination with a supply-circuit, a dynamo-electric machine adapted to act both as a motor and as a generator to return energy to the supply circuit, of an auxiliary source of energy for exciting the field-magnet winding thereof, of a relay device having a plurality of actuating coils, one of said coils being energized in accordance with the current traversing said auxiliary source under predetermined conditions and the other coil being energized in accordance with the current traversing said machine, whereby said relay device is actuated when both coils are energized in the same direction, but remains inoperative when the coils are energized in opposite directions.

6. In a system of control, the combination with a supply circuit, a dynamo-electric machine adapted to act both as a motor and as a generator to return energy to the supply circuit, of an auxiliary source of energy for exciting the field-magnet windings thereof, a relay device provided with contact members for closing certain motor-controlling circuits, an actuating coil for said relay device adapted to be energized in accordance with the current traversing said auxiliary source, and a second actuating coil for said device adapted to be energized in accordance with the current traversing said machine, whereby said relay device is actuated when current traverses said second coil in the regenerative direction to assist the first coil, but the device remains inoperative when current traverses said second coil in the accelerating direction to oppose the first coil.

7. In a system of control, the combination with a supply circuit, a plurality of dynamo-electric machines adapted to act both as motors and as generators to return energy to the supply circuit, and an auxiliary source of energy for exciting the field-magnet windings thereof, of a relay device actuated in accordance with the current traversing said auxiliary source, a second relay device having a plurality of actuating coils, one of said coils being energized in accordance with the current traversing the auxiliary source and the second coil being energized in accordance with the current traversing the first machine, whereby said relay device is actuated when current traverses said second coil in the regenerative direction to assist the first coil, but the device remains inoperative when current traverses said second coil in the accelerating direction to oppose the first coil, switching means dependent upon the first of said relay devices for regeneratively connecting said first machine to the supply circuit, and switching means dependent upon predetermined energization of the second relay device for subsequently connecting the second machine to the supply circuit.

In testimony whereof, I have hereunto subscribed my name this 30th day of Oct., 1915.

NORMAN W. STORER.